Jan. 20, 1953 L. M. CLEAL 2,625,760
GARDEN MARKER
Filed June 27, 1949
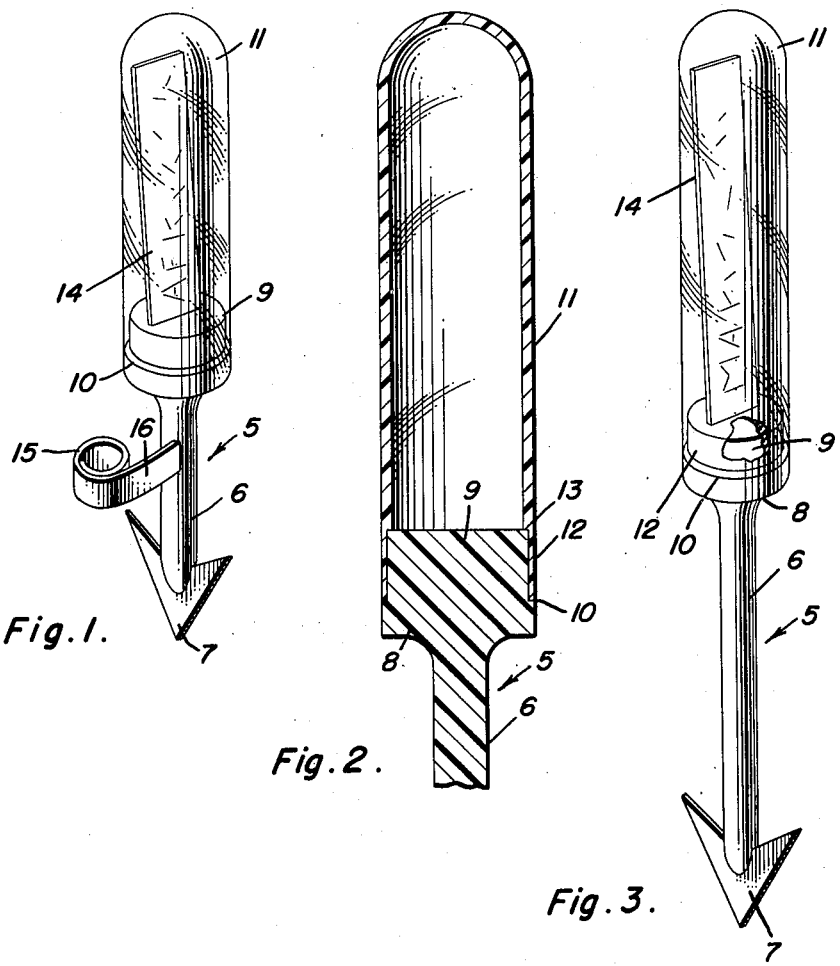
Inventor
Lyle M. Cleal
By Clarence A. O'Brien
and Harvey B. Jacobson
Attorneys Patented Jan. 20, 1953

2,625,760

UNITED STATES PATENT OFFICE 2,625,760

GARDEN MARKER

Lyle M. Cleal, Montgomery, Ala.

Application June 27, 1949, Serial No. 101,569

1 Claim. (Cl. 40—19)

The present invention relates to a novel kind of guide or marker which is adapted for use in and around home gardens to facilitate the often-desired marking of trees, plants, and flowers for record-retaining and identification purposes.

It is not uncommon to see rosebushes identified by suitably marked tags and tabs. Also it is not uncommon for home gardeners to make up their own labels and tags and use same in various ways for keeping handy records for current and future reference purposes. To my mind, the types of markers customarily employed are often makeshift and unreliable in character. Faced with this problem, I have discovered the need for the provision of what I believe to be an efficient and practical identification marker or so-called guide.

In carrying out the principles of my invention, I provide a transparent container in which the written or other similarly prepared record card is shielded and readily accessible. Usually, the container is in the form of a non-breakable transparent capsule and houses the inscribed card in such a way that the information thereon may be checked without necessitating removal of same.

Another object of the invention has to do with the stated transparent capsule-like container for the card or other marker wherein same is mounted on a pointed stake such as may be pressed and anchored in the ground adjacent to the tree, plant, or flower to be marked.

Another object of the invention has to do with the container and shank, with or without the pointed anchor, said shank having a coiled spring thereon which may be attached to the trunk of a small tree or shrub, or in a similar manner clipped, as it were, on a convenient stem or other part of a plant.

Other objects and advantages will become more readily apparent from the following description and the accompanying illustrative drawings.

In the accompanying sheet of drawings, wherein like numerals are employed to designate like parts throughout the views:

Figure 1 is a perspective view of a garden guide constructed in accordance with the present invention.

Figure 2 is an enlarged fragmentary sectional view of the headed end of the ground-penetrating stake with transparent container attached.

Figure 3 is a perspective view, similar to Figure 1, with the coiled spring clipping means omitted.

Referring now to the drawings by distinguishing reference numerals and lead lines, the numeral 5 designates a base unit which is made of suitably colored commercial plastics or equivalent material and which is characterized by a shank 6 which is sufficiently rigid to attain the ends wanted. The shank is provided, as shown in Figs. 1 and 3, at its lower end with a spear-like anchor 7 which is adapted to penetrate the ground to facilitate pressing and anchoring said base unit in the ground. The other or "upper" end of the shank has an enlargement constituting a head 8, the upper end portion of which is reduced at 9 to provide a shoulder 10.

The capsule-like container is, in effect, an elongated cap which is fitted over the head 9. More specifically, I utilize a rigid or semi-rigid elongated container of the type illustrated, the same being denoted by the numeral 11 and being, in practice, made from transparent commercial plastics. The lower end is reduced in thickness to form a neck 12 having a shoulder 13, the neck fitting over the head portion 9 with the shoulder engaging said head portion, with the neck resting on the shoulder 10 forming a part of said head portion.

The container or cap 11 is frictionally fitted on the shouldered head to facilitate removal and to provide a satisfactory receptacle or holder for the marker and identification tag 14. The latter may be of any appropriate size and material and is preferably such that it will bear inscriptions as to the name of the plant, the date of planting, whether a perennial or an annual, and other data which would be useful to the gardener. Since the container 11 is transparent, it will, ordinarily, be possible to check the data on the marker card without removing it. However, if it is desired to add further information, the cap is slipped off, suitable notations are made and the parts are reassembled.

In the form of the invention seen in Figure 3, the pointed stake may be pressed down into the ground, thus anchored and maintained.

In the modification seen in Figure 1, the shank may be shorter, if desired, and provided with means provided for clipping the device directly on the tree, plant, or flower, as the case may be. In the arrangement shown, I provide a so-called broad coiled spring 15 attached by a limb 16 to the shank. The idea of the invention, however, is to provide a transparent container for accessibility, protection and permanence, to provide means whereby same may be anchored, if preferred, in the ground. In addition, alternative means is provided whereby said container, with or without the pointed shank, may be detachably clipped on a convenient part of the tree or other plant.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

For use in supporting and anchoring a capsule-like transparent cap which is adapted to be used as a container and protector for a tree, plant and flower marker in a home garden and wherein said cap is open at its bottom and closed at its top; a one-piece unit of commercial plastics embodying a rigid shank provided on its upper end with an integral enlarged circular head, said head having its upper portion flat and said head being marginally reduced in diameter and providing a peripheral shoulder, said shoulder constituting a ledge, the lower portion of said shank being adapted to be staked in the ground, the intermediate portion of said shank being provided with a lateral outstanding limb and said limb having a terminal portion formed into a resilient clip, said clip being adapted for attachment to a predetermined portion of a tree, plant or flower.

LYLE M. CLEAL.

REFERENCES CITED

The following references are of record in the file of this patent:

UNITED STATES PATENTS

| Number | Name | Date |
|---|---|---|
| 343,365 | Daniels | June 8, 1886 |
| 1,073,114 | Gudgeon | Sept. 16, 1913 |
| 1,621,810 | Rice | Mar. 22, 1927 |
| 1,676,927 | Richard | July 10, 1928 |
| 1,766,704 | Chase | June 24, 1930 |
| 2,229,938 | Rigg | Jan. 8, 1941 |

FOREIGN PATENTS

| Number | Country | Date |
|---|---|---|
| 12,148 | Germany | June 16, 1880 |